C. N. Owen,
Mower.

No. 103,490.

Patented May 24, 1870.

Witnesses
H. N. Doubleday
G. A. Wilson

Charles N. Owen
by his attorney
A. M. Smith

UNITED STATES PATENT OFFICE.

CHARLES N. OWEN, OF SALEM, OHIO.

IMPROVEMENT IN HARVESTERS.

Specification forming part of Letters Patent No. 103,490, dated May 24, 1870.

*To all whom it may concern:*

Be it known that I, CHARLES N. OWEN, of Salem, Columbiana county, State of Ohio, have invented a certain new and useful Improvement in Harvesters, of which the following is a full, clear, and exact description, reference being had to the accompanying drawing, making part of this specification, in which—

Figure 1:
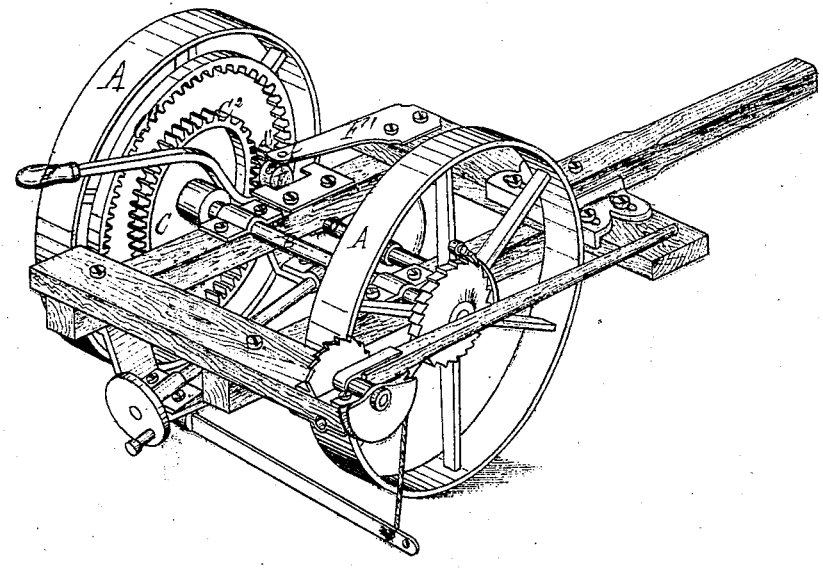
Figure 2:
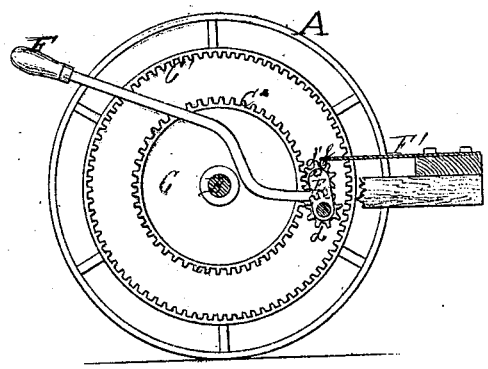

Figure 1 is a perspective view of a harvester having my improvement attached, and Fig. 2 is a sectional view taken through line $x\ y$.

The invention relates to the construction of the devices for effecting the change of speed of the cutters from the rapid motion required in mowing to the slower one used in reaping; and consists in so constructing and arranging the gearing that the desired change is effected by means of two driving-rims, of different sizes, and two pinions, which may be both of the same size, and both of which are always in gear with each other, and are always employed as a part of the driving-gear when the machine is in operation.

The invention further consists in a novel method of maintaining the parts either in or out of gear.

In the drawing, A A are the driving-wheels, upon which are supported the frame and gearing of a mower and reaper of any desired pattern. I have shown a two-wheeled machine, but my improvements are equally adapted to be applied to a single-wheeled one. These driving-wheels are loosely mounted upon main axle B, and are connected therewith by means of the usual backing-ratchets.

C is a disk or head keyed firmly to axle B, and provided with an internally-toothed rim, $C^1$, and an externally-toothed rim or spur-gear, $C^2$, the relative size of these two gears being as two to three. D is the pinion or counter-shaft, supported in suitable bearings in such position that one end shall extend between the two rims or gears $C^1\ C^2$. $d$ is a pinion keyed upon the end of counter-shaft D in the same vertical plane with gears $C^1\ C^2$, and midway, or thereabout, between them, but not engaging with either of them. E is carrying-arm mounted upon and vibrating about counter-shaft D. $d'$ is a transmitting pinion or idler mounted upon arm E in such manner as to always be in mesh with pinion $d$, and to vibrate about it as a center. F is a shifting lever rigidly attached to arm E. F' is a spring-latch, provided with a spur, $f$, and secured upon some suitable portion of the frame in such position that spur $f$ can enter a notch or recess, $e$, formed for its reception in the free end of arm E.

The other parts of the machine may be of any usual or desired construction and arrangement, and as they form no part of the invention for which protection is asked in this application, I will not describe them in detail.

In the drawing the parts are represented as being in the position which they should occupy when it is desired to impart to the cutter-bar a motion suitable for reaping. The pinion $d$ on counter-shaft D is not in mesh with either of the rims $C^1\ C^2$, but is operated from rim $C^2$ through the medium of the transmitting-pinion $d'$, as is plainly shown in Fig. 2, the gears being held in this position by means of spring-latch F', provided with spur $f$, which engages with the free end of arm E in such manner as to resist the backward thrust of gear $C^2$ upon gear $d'$.

By raising lever F, I throw gear $d'$ from gear $C^2$ and into mesh with gear $C^1$, which, on account of its greater size, will impart the increased motion which is required for mowing, and in case I wish to throw the machine out of gear entirely I stop gear $d'$ midway, or thereabout, between rims $C^1\ C^2$, when spur $f$ will snap into the notch $e$ and lock the cutters out of action.

Having now described my invention, what I claim as new, and desire to secure by Letters Patent, is—

1. In a harvesting-machine, a double speeding device consisting of a transmitting-pinion arranged to vibrate about a driven pinion or pinion-shaft as a center, in combination with two driving-gears of unequal size, with either of which the transmitting-pinion may be made to engage for driving the pinion-shaft, substantially as described.

2. The vibrating arm E, notched or recessed at its free end, and spring-latch F, in combination with the driven pinion $d$ and transmitting-pinion $d'$, for throwing the pinion $d$ into and out of action, substantially as set forth.

C. N. OWEN.

Witnesses:
EDWARD KENNETT,
THOMAS KENNETT.